(12) United States Patent
Smith

(10) Patent No.: US 7,805,987 B1
(45) Date of Patent: Oct. 5, 2010

(54) SYSTEM AND METHOD FOR PNEUMATIC TIRE DEFECT DETECTION

(76) Inventor: Bradley R. Smith, 1008 4th Ave. NE., Byron, MN (US) 55924

( * ) Notice: Subject to any disclaimer, the term of this patent is extended or adjusted under 35 U.S.C. 154(b) by 0 days.

(21) Appl. No.: 12/229,027

(22) Filed: Aug. 19, 2008

(51) Int. Cl.
*B60C 23/02* (2006.01)
(52) U.S. Cl. ..................................... 73/146.5
(58) Field of Classification Search ........................ None
See application file for complete search history.

(56) References Cited

U.S. PATENT DOCUMENTS

| | | | |
|---|---|---|---|
| 4,258,657 | A | 3/1981 | Fritz |
| 5,313,827 | A | 5/1994 | Yovichin |
| 5,485,406 | A * | 1/1996 | Wada et al. ................. 702/167 |
| 6,069,966 | A | 5/2000 | Jones et al. |
| 6,269,689 | B1 | 8/2001 | Alexander |
| 6,615,650 | B2 * | 9/2003 | Mahner |
| 6,789,416 | B1 * | 9/2004 | Tracy et al. .................... 73/146 |
| 6,840,097 | B1 * | 1/2005 | Huber et al. |
| 7,177,740 | B1 * | 2/2007 | Guangjun et al. |
| 7,199,880 | B2 * | 4/2007 | Braghiroli .................... 356/601 |
| 7,260,983 | B2 * | 8/2007 | Nosekabel et al. |
| 7,523,665 | B2 * | 4/2009 | Katsumata et al. |
| 2001/0052259 | A1 * | 12/2001 | Mahner |
| 2005/0044943 | A1 * | 3/2005 | Godeau et al. |
| 2007/0204684 | A1 * | 9/2007 | Muhlhoff et al. |
| 2008/0011074 | A1 * | 1/2008 | Braghiroli |
| 2008/0066532 | A1 * | 3/2008 | Shaw et al. |
| 2009/0000370 | A1 * | 1/2009 | Lionetti et al. |

* cited by examiner

*Primary Examiner*—Andre J Allen
(74) *Attorney, Agent, or Firm*—Paul W. O'Malley

(57) ABSTRACT

Differential expansion (or contraction) of areas of a tire sidewall is measured by constructing height profiles of the tire at each of at least two different static pressures to detect defects in the tire. Light sources project a plurality of illuminated lines onto a tire and cameras are used to record the position of the lines to construct the height profiles of a rotationally fixed position tire.

23 Claims, 10 Drawing Sheets

SYSTEM AND METHOD FOR PNEUMATIC TIRE DEFECT DETECTION

BACKGROUND

1. Technical Field

The disclosure relates to pneumatic tire inspection and more particularly to a system and method for detecting tire zippers.

2. Description of the Problem

Pneumatic tire defects present serious cost and safety problems, particularly on the retreaded tires commonly used with over the road trucks. Perhaps the most damaging defect is the "zipper", a breakage of the reinforcing cords that can span the tire radially from bead to bead. Zippers are usually the result of driving on an under-inflated tire which in turn results in cord-damaging flexure and overheating of the sidewall. The term "zipper" refers both to the appearance of the broken cords and to the pattern of their spread. Since each cord depends on its neighbors for support, the failure of one cord makes the failure of an adjacent cord, and each subsequent cord, more likely.

The inspection of tires for zippers has frequently been done by human technicians. A great deal of effort has gone into developing automated techniques for the detection of zippers and other tire-defects in order to standardize and expedite the process. Among the automated inspection techniques are systems based on X-ray, acoustical, electrical, and mechanical scans. Tires are subjected to a number of pressure regimens, such as vacuum, standard air, single, and dual pressures. All of these techniques are of some value in discovering defects, yet they haven't displaced inspections by trained human inspectors, particularly for detecting zippers. In an industry interested in safety improvements and economy of operation, consistent and predictable methods amenable to widespread use for zipper detection, even as a complement to human inspection, are desirable.

Automated inspection regimens based on dual-pressure approaches have achieved the most success. Dual pressure systems involve mounting a tire for rotation relative to sensors and inspecting the tire at different levels of inflation. Typically, the tire is first inflated to a baseline pressure and the external surface is scanned while the tire is rotated. Then the tire is inflated to a second, higher pressure and examined again while rotating to determine if the tire's surface exhibits differential degrees of expansion under the higher pressure. Significantly defective and hence weaker areas will exhibit differential displacement relative to the rest of the tire as the pressure change. While it is to be expected that the two height profiles will differ, scans of a tire with weaker areas will result in height profiles that vary unevenly. It is also possible to start with a higher inflation pressure as the base line and then reduce pressure in the tire and look for differential degrees of contraction.

U.S. Pat. No. 6,616,650 granted to Mähner may be taken as representative of the art relating to the dual pressure methodology for examination of a tire. Light sections are projected onto the exterior surfaces of the sidewalls of a tire, and the tire is rotated relative to a camera. The camera captures the reflection of the projected light sections at defined rotary positions of the tire relative to the camera and data processing equipment determines a data representation for the shapes for the captured section images. Differential changes in shape as a byproduct of changes in pressure are then isolated as indicators of possible defects.

A common feature in the prior art is provision for having the tire rotate relative to sensors. This may involve having either the tire rotate or the sensors revolve around the tire's usual axis of rotation.

SUMMARY

A tire inspection system is provided which includes a housing or cage and a track installed on the cage. The track defines mounting and scanning locations for a tire to undergo inspection. A carriage for carrying a tire rides on the track and allows for movement between the tire scanning location within the cage and the tire mounting location outside of the cage. An optical (or comparable) scanning system provides for detecting energy reflected by a tire at the tire scanning location, typically in the form of images captured of illuminated areas of the tire. In order to enhance operation of the image capture process, an energy projection system is provided which directs energy against exterior surfaces of a tire at the tire scanning location for detection upon reflection by the scanning system. The tire to be scanned is positioned to be rotationally fixed relative to the tire scanning system at the tire scanning location.

Additional effects, features and advantages will be apparent in the written description that follows.

BRIEF DESCRIPTION OF THE DRAWINGS

A preferred mode of use, further objects and advantages thereof, will best be understood by reference to the following detailed description of an illustrative embodiment when read in conjunction with the accompanying drawings, wherein.

DETAILED DESCRIPTION OF THE PREFERRED EMBODIMENT

Figure 8:
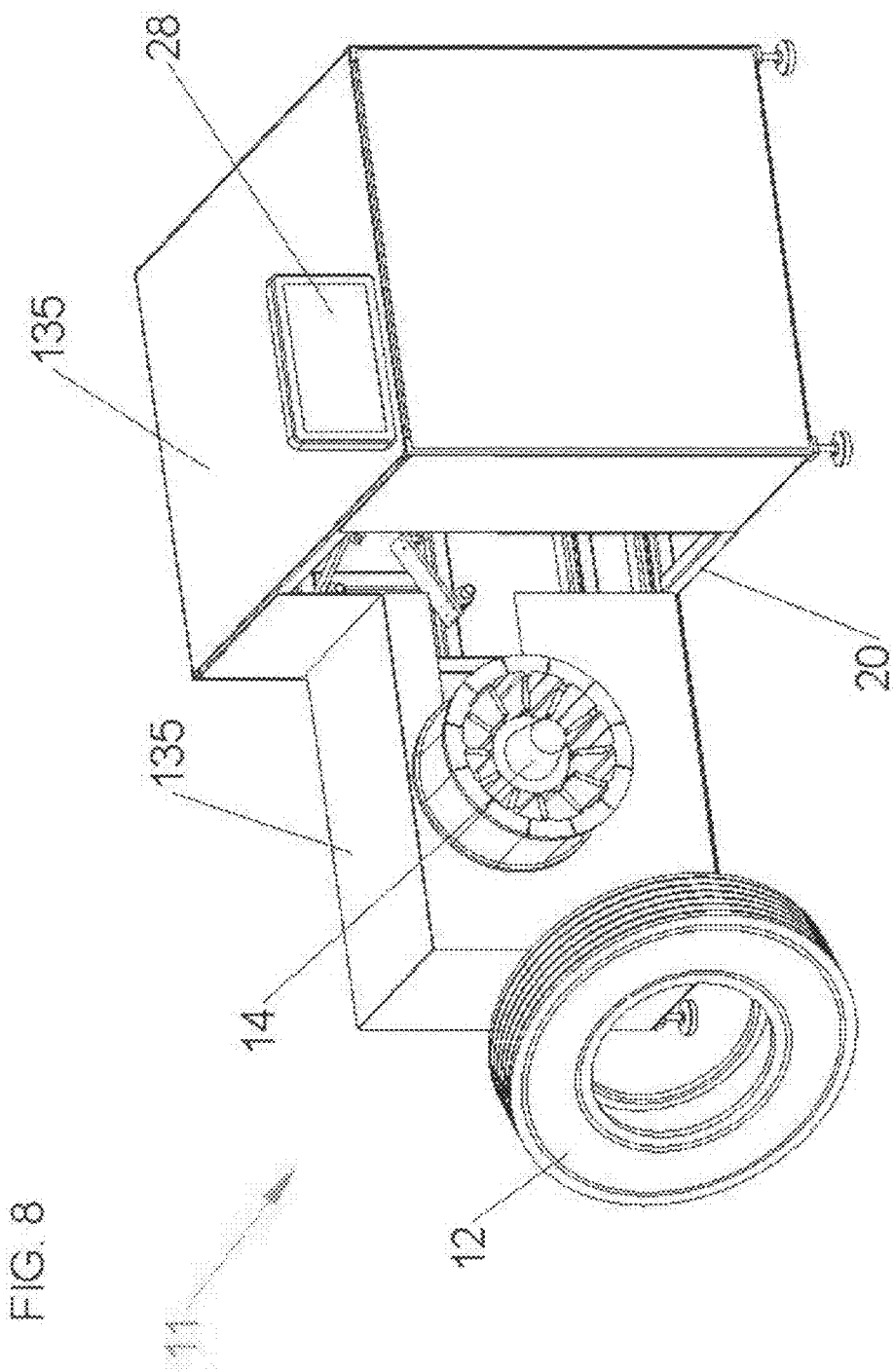
FIG. 8 is a perspective view of the tire inspection apparatus with exterior protective barriers fixed.

Referring now to the drawings and in particular to FIGS. 1-5, a preferred embodiment of a tire inspection apparatus 11 is illustrated from several points of view. Tire inspection apparatus 11 provides for the temporary mounting of a tire 12 on a mandrel 14 and the positioning of the tire to be scanned for defects, including particularly, but not exclusively, defects associated with weakening of the sidewall or cord structure of the tire. Tire inspection apparatus 11 includes a cage 20 in which the tire 12 is positioned to be scanned. Cage 20 is depicted as open. However, because the preferred embodiment of the invention uses laser light for illuminating sections of the tire it may be advantageous to close the open sides and top of the cage to prevent direct observation of laser light during operation. In addition, because the tire 12 is pressurized for inspection, and may be weakened due to defects or damage, it is desirable to confine debris separating from the tire in the unlikely event of failure of the tire. FIG. 8 illustrates a possible configuration of shielding around the cage 20.

The tire 12 is temporarily mounted on a mandrel 14 while the mandrel is located outside of the cage 20 and then moved on the mandrel to a location within the cage. Mandrel 14 is conventional, includes radially positionable sections which allow different sizes of tires to be handled, and provides an internal valve by which to admit and release air from a tire. A carriage 18 rides on tracks 16 and carries the mandrel 14. This allows locating the mandrel 14 outside of cage 20 for mounting of the tire and for relocating the mandrel inside the cage for scanning of the tire. A pneumatic drive system (not shown) moves the carriage 18 on tracks 16, which are mounted on support beams 22 extending from the cage 20. While mandrel 14 allows rotation of the tire 12, the inspection system and method of the illustrative embodiment do not require rotation of the tire, but instead provide for rotationally fixing the position of a tire relative to the scanners once the tire is located within cage 20.

Scanning the tire may involve projecting light to produce "illuminated sections" on the tire 12. The illuminated sections may exhibit various shapes, such as lines or dots, and these in-turn may be static or moving. Areas of the tire containing illuminated section(s) for which an image is captured by a camera are termed "regions". The differential shifting of an illuminated section correlated with changes of internal air pressure for the tire are used as indicators of a possible tire defect. Where scan lines are moving an "illuminated section" may and typically will correspond to less than the area swept.

In order to generate illuminated sections on a tire 12 and to detect the illuminated sections, light sources 30 and cameras 34 are located with respect to the scanning location of the tire 12 within cage 20, with the rotational orientation of the tire 12 being fixed relative to the light sources and cameras by the mandrel 14. A camera 34 captures am image of a region of the tire exhibiting one or more illuminated sections. The illuminated sections are formed by beams which preferably have a single light source. In some cases it may be preferable to have more or fewer light sources than regions to be established (for example, there may be one light source per light section, or just one for the entire scanning system). The light sources 30 and cameras 34 are illustrated as located on arms 32, which are radially arrayed in two groups, one on each side of the tire 12 once located within cage 20.

The particular means of fixing the location of the cameras 34 and light sources 30 is not usually important, though a modification of the preferred embodiment may allow for linear movement of the cameras and light sources radially relative to the tire's central axis. The light sources 30 are preferably provided by a laser source and a beam splitter which divides a laser beam into a plurality of parallel lines projected toward the tire. A beam splitter may be constructed from a beam spreader slit system.

Figure 9:
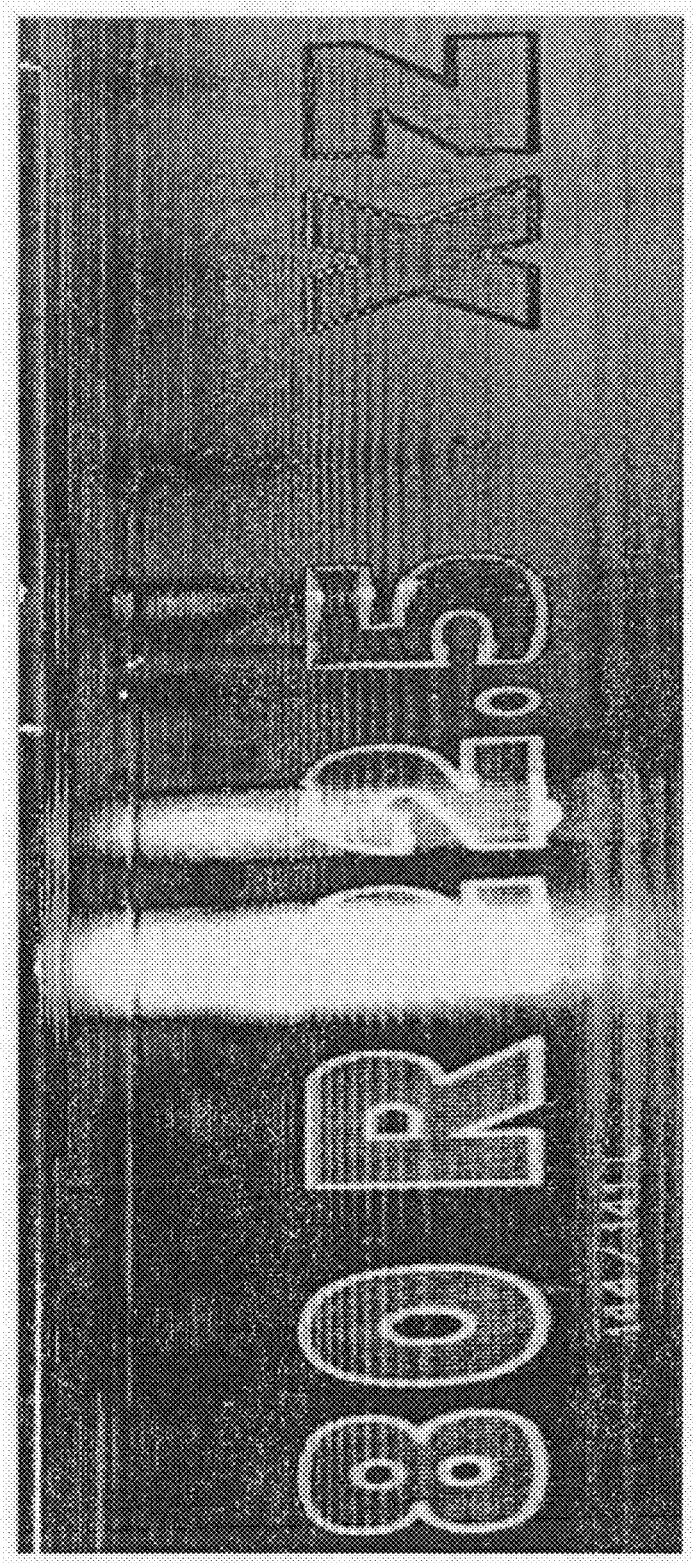
FIG. 9 is a high resolution gradient mapping of a tire.

A galvohead may be used with a laser source as an alternative way to generate multiple lines. Such a system may be used to increase the number of lines, up to the point of effectively continuous coverage of a tire sidewall. A galvohead contains a small mirror controlled by a servo motor. Such a system would sweep the laser line across the tire sidewall, while the camera captures frames at set increments of any desired resolution. By employing a two-axis galvohead system, any variation of patterns may be projected as illuminated sections, including, but not limited to, arcs or dots. This two-axis system could also be used to illuminate areas for multiple cameras. Another embodiment that would provide laser sweeping mounts the laser, and possibly the camera, to a linear slide. The linear slide could be placed at any angle, allowing the illumination to sweep in that direction, for example from the tire's radial direction, or its perpendicular. Those skilled in the art will now recognize that there are many variations in how light sources can combine with associated optics to produce illuminated sections on a tire, the end result being an image for capture by a camera or other photo sensor and analyzed for height data. These methods may be used to provide a highly detailed gradient mapping of the tire sidewall (See FIG. 9 for an example), although lower resolution mapping may also yield adequate results.

Carefully controlling the illumination of sections of the tire undergoing inspection is essentially done for purposes of image repeatability, that is, it makes it easier to map differential deflection of the surface of the tire at different pressures if "known" or at least "related" locations on the tire of the tire are compared. The word "known" is used guardedly. It would be ideal to compare changes in height at identical locations. However, the surface of a more highly inflated tire is larger than the surface of the same tire at lower pressure. Since the surface of the tire stretches as internal pressure increases the tire may be viewed as having a different surface at the higher pressure. Even though the surfaces are "different" it can be said that particular locations on the two surfaces correlate one to another. The spot illuminated by light projected onto the tire is unlikely to illuminate exactly corresponding points at the differing inflation levels, though it is expected that the illuminated points will be "close enough" to be considered corresponding points. This is especially likely If the light is projected onto the tire at some angle other than perpendicular to the surface. It is clear then that at different levels of expansion, the light will hit a (slightly) different relative location on the surface so that the reference point of line moves along the surface to a small degree. If a defect is present the degree of stretching at a location will be unpredictable with the result that the area of the location illuminated will change to an unforeseen degree, or the defective area may appear to shift.

At contemporary imaging resolutions, with economically affordable cameras, a tire is essentially a black featureless surface. Illuminating precise points or sets of points with a bright light, particularly from a laser, allows quick assurance that the corresponding locations on the tire are being compared. In theory, given a camera with enough resolution and light sensitivity and a computer with sufficient data processing power, a tire could be mapped at a sufficient resolution to allow points on the tire surface to be tracked simply by identifying distinctive locations. This would be possible even when the tire was uniformly illuminated, or even under simple ambient light. This could allow more closely corresponding points/coordinates on the tire to be compared at different pressures using details of the tire's surface to fix reference points on the surface for comparison against one another.

In either event, an optical system is provided which allows reference points to be defined with relation to the surface of a tire. The identification of corresponding reference points allows comparison of changes in tire surface height at the reference points/lines relative to one another, or relative to a datum, in order to locate tire defects. With contemporary technology it is cost effective to use high intensity light to illuminate sections of the tire's surface to define the reference points to be used to make the analysis. However, it is conceivable to construct a tire to produce a surface, or to use high resolution optics to measure a tire's surface, that potentially would allow identification of reference points without use of illumination of points, which might mitigate the slight tendency of such points to move along the surface as internal tire pressure changes. It may be possible to correlate defective locations on tires with loss of detail on increased inflation which make it difficult to verify correspondence of points on the tire surface.

For each of the two faces/sidewalls of the tire 12, there are six evenly spaced arms 32, each holding one camera 34 and one light source 30, with both camera and light source aimed at that arm's distinct region/scanning area on the tire. The light sources 30 and cameras 34 are installed on the arm in a non-parallel fashion, preferably so that the optical axis of camera intersects the forward projection axis of a light source 30 at about a 30 degree angle (though other angles are allowable). This allows changes in the "height" of the exterior surfaces of the tire sidewalls to be determined by triangulation. The positioning of the cameras and light sources, while fixed in the preferred embodiment during scanning, may be changed, and fewer or more light sources and cameras may be used. Ideally the entire sidewalls of the tire are covered with a sufficient number of lines to obtain a height profile of sufficient resolution to not miss significant defects.

In simple terms, differential expansion (or contraction) between local areas of a tire is measured by constructing height profiles of the tire at each of at least two different pressures. One height profile (a base measurement) can be subtracted from the height profile for a second height profile done at a different pressure to construct a differential height profile for the tire undergoing examination. It is possible to scan the tire during pressure changes to construct differential rates of change in height profiles as a function of pressure changes. Such data could provide a way of further characterizing a defect in terms of probable size or severity of the defects identified.

Operator control of the apparatus 11 is provided through a touch screen monitor 28 shown mounted along an upper edge of cage 20. Touch screen monitor 28 provides for operator control of the process implemented by apparatus 11 and display of results of the scanning process (though a color printer or other device can be provided). Data processing is typically provided through a programmed process control computer 24. An external source of compressed air (not shown) is expected to be available.

The embodiment described here provides for a combination of a very high tire scan speed and differential visualization system. The light projection and sensor arrangements allow a scan of an entire tire sidewall, without rotating the tire or sensors, while obtaining short scan times. As described above, a system providing an illumination source which emits an area, band, or line of light (the latter two commonly utilizing a light beam spreader or guide to spread the light into said band, particularly if a narrow band is desired) across one or more typically both sidewalls of the tire, and one or more high-resolution digital camera(s) to monitor an image of one sidewall (or cameras on both sides to do the two sidewalls simultaneously). The focused camera images are fed to a connected computer system 24 for analysis, and in particular for conversion into differential two-dimensional color maps, in which the difference in sidewall displacement—effectively, the third dimension—is represented by continuous variations in color. Zippers, in particular—their size, position, severity—appear as pronounced color anomalies no matter where they are located on the sidewall. Generally, zippers do not occur in the tread area. Active scanning systems providing for energy projection other than light, such as sound waves, are possible. Those skilled in the art will now realize that numerous variations are possible in the relative number of lasers to cameras.

Once the tire is mounted, the system rapidly inflates the tire (to 10-40 psi) to facilitate proper seating. This high-pressure-first approach is very useful to guarantee proper and secure seating of the tire on the mandrel for that and the subsequent scan. The tire is stationary while the sidewall is illuminated and photographed by the camera(s). Then the pressure is decreased substantially (possibly down to zero psi), and the process repeats. The scan data is sent in real-time to the process computer 24.

Figure 7:
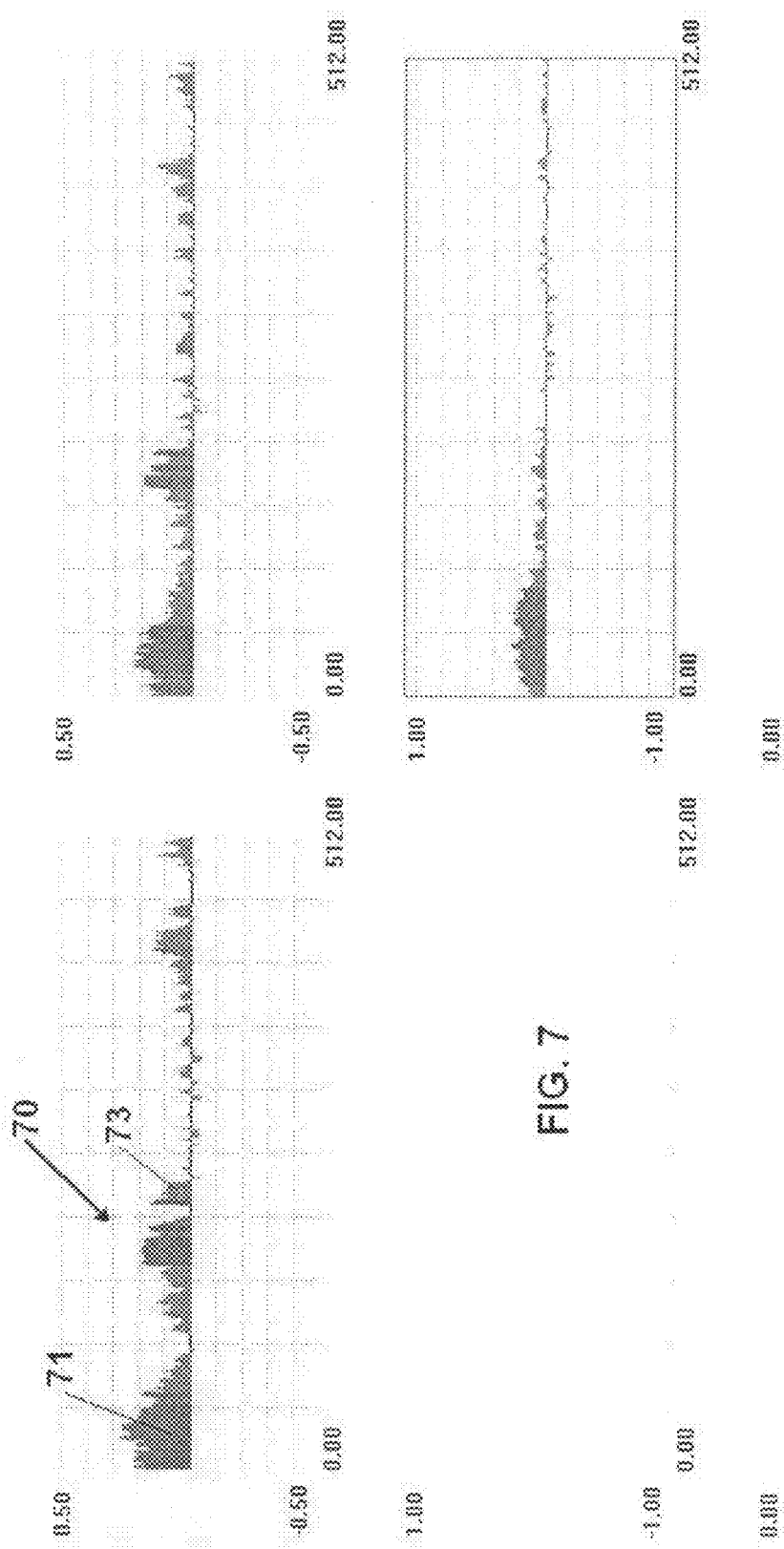
FIG. 7 is a series of graphs illustrating data sets collected for a tire undergoing inspection.

The scans are analyzed for sidewall displacement relative to the plane of the tire by any of several methods, though the preferred method is light-line planar offset analysis (which is illustrated above). It is also possible to use optical stereography (the use of a stereo camera or a pair of cameras per sidewall scan area), mechanical contact sensors of several types, strain gauge sensors, optical reflection deflection, acoustical sensors, or non-contact rangefinders of various sorts. The low pressure displacement is subtracted from the high pressure displacement, the difference then being converted into maps or graphs 70 (See FIG. 7). Differential shading or coloring 71, 73 may be used to highlight out of bounds differential height profiles. Where optical imaging is used it may be further possible to check the tire for cosmetic and other non-zipper defects. Since zippers will contract significantly more than the rest of the tire, and since the entire sidewall surface is clearly visible in the differentially visualized color map, in every case they are easily and reliably seen for what they are even by minimally- or un-trained individuals. The left—most point of a graph may arbitrarily be set to correspond to a location on the tire characterized by its position on the mandrel 14 relative to the sensors. For example, the beginning of a graph may correspond to the top, dead center of the tire as positioned within the cage. Another method for locating the defect on the tire sidewall is to superimpose the graphs over a photo of the tire. The photo may be taken with the same camera(s) used to acquire the scan data for the height profiles.

Figure 1:
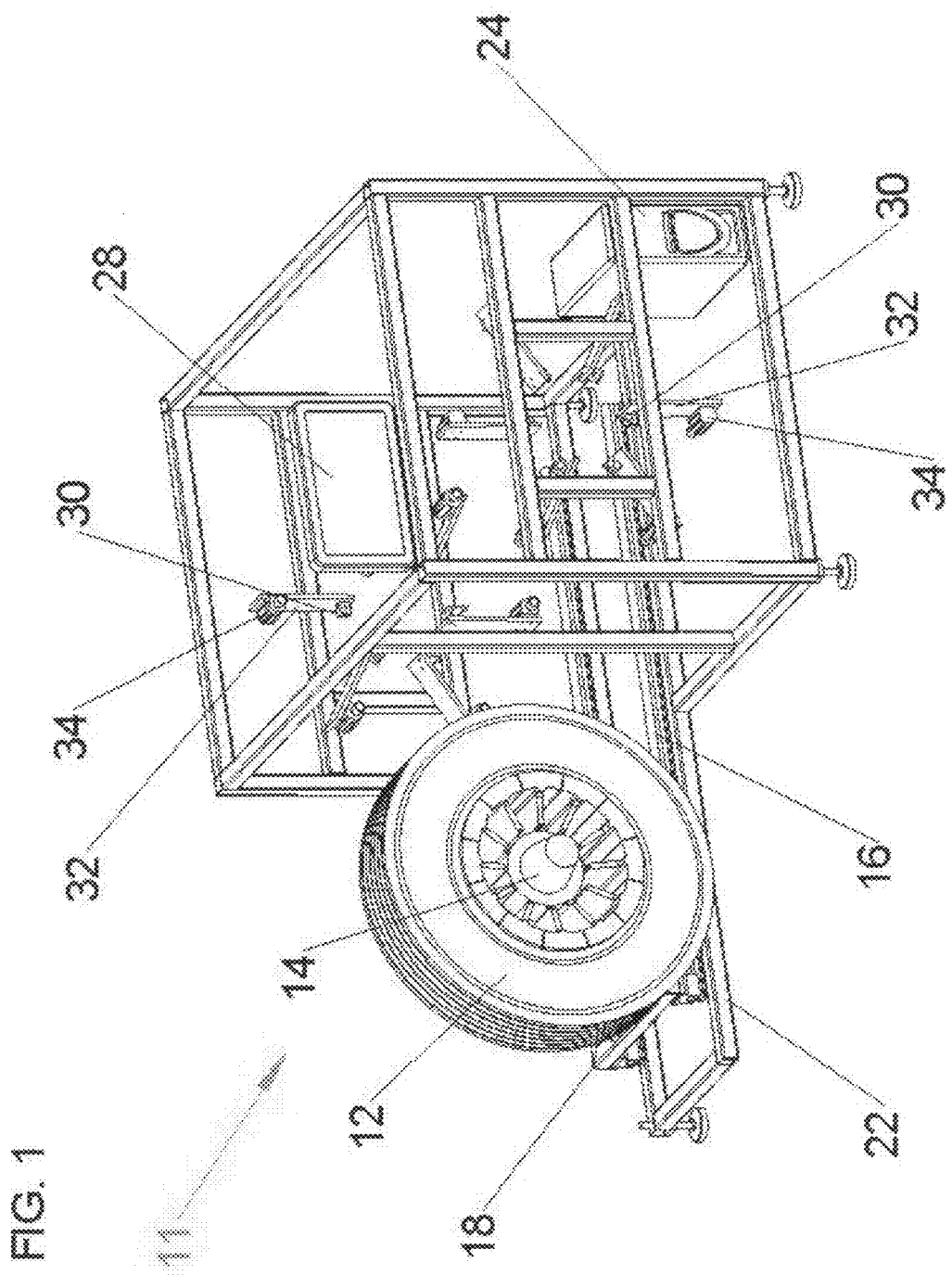
FIG. 1 is a perspective views of a tire inspection apparatus.
Figure 2:
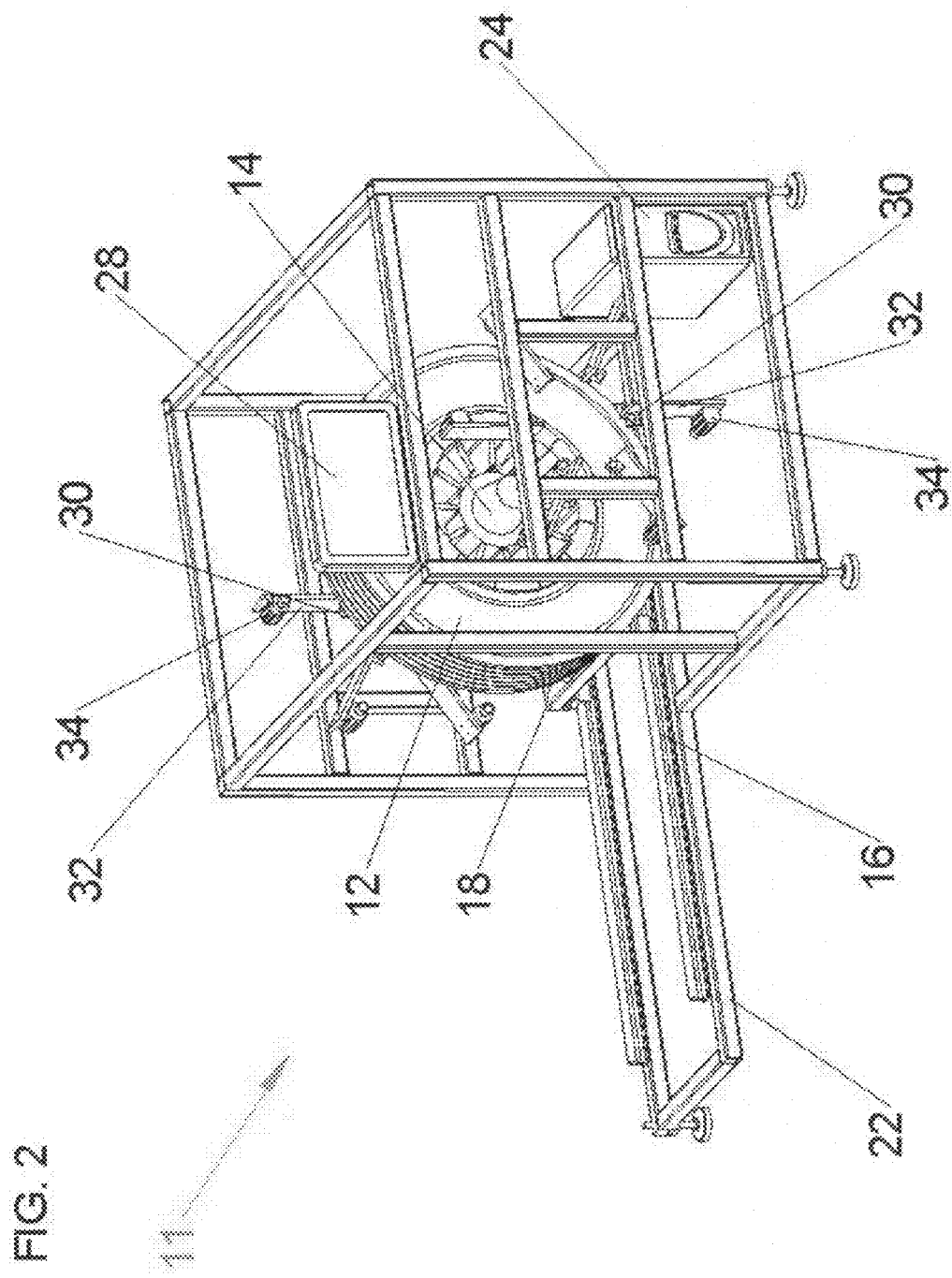
FIG. 2 is a perspective view of the tire inspection apparatus of FIG. 1 in which a tire has been located to be scanned.
Figure 3:
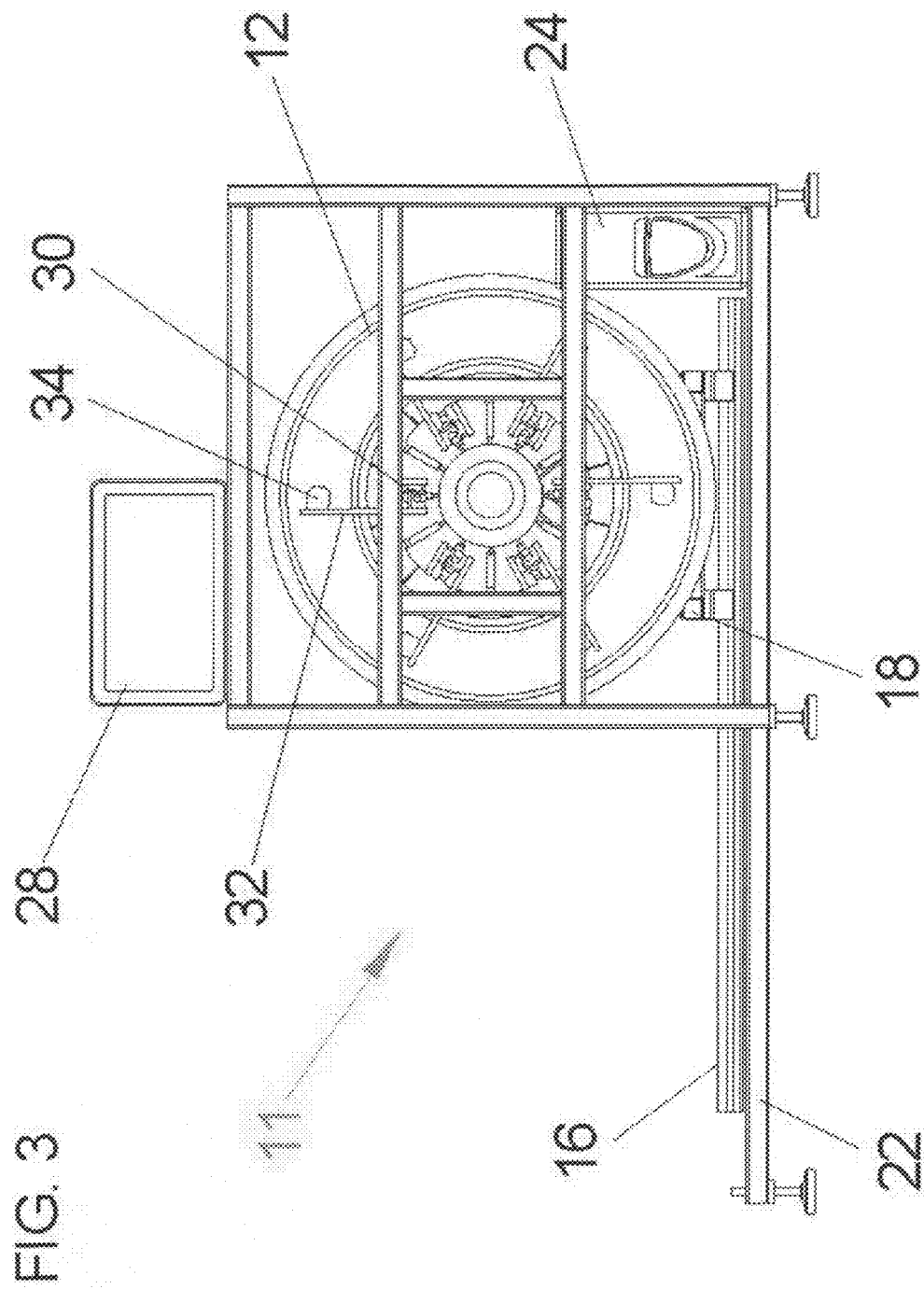
FIG. 3 is a side elevations of the tire inspection apparatus of FIGS. 1 and 2.
Figure 4:
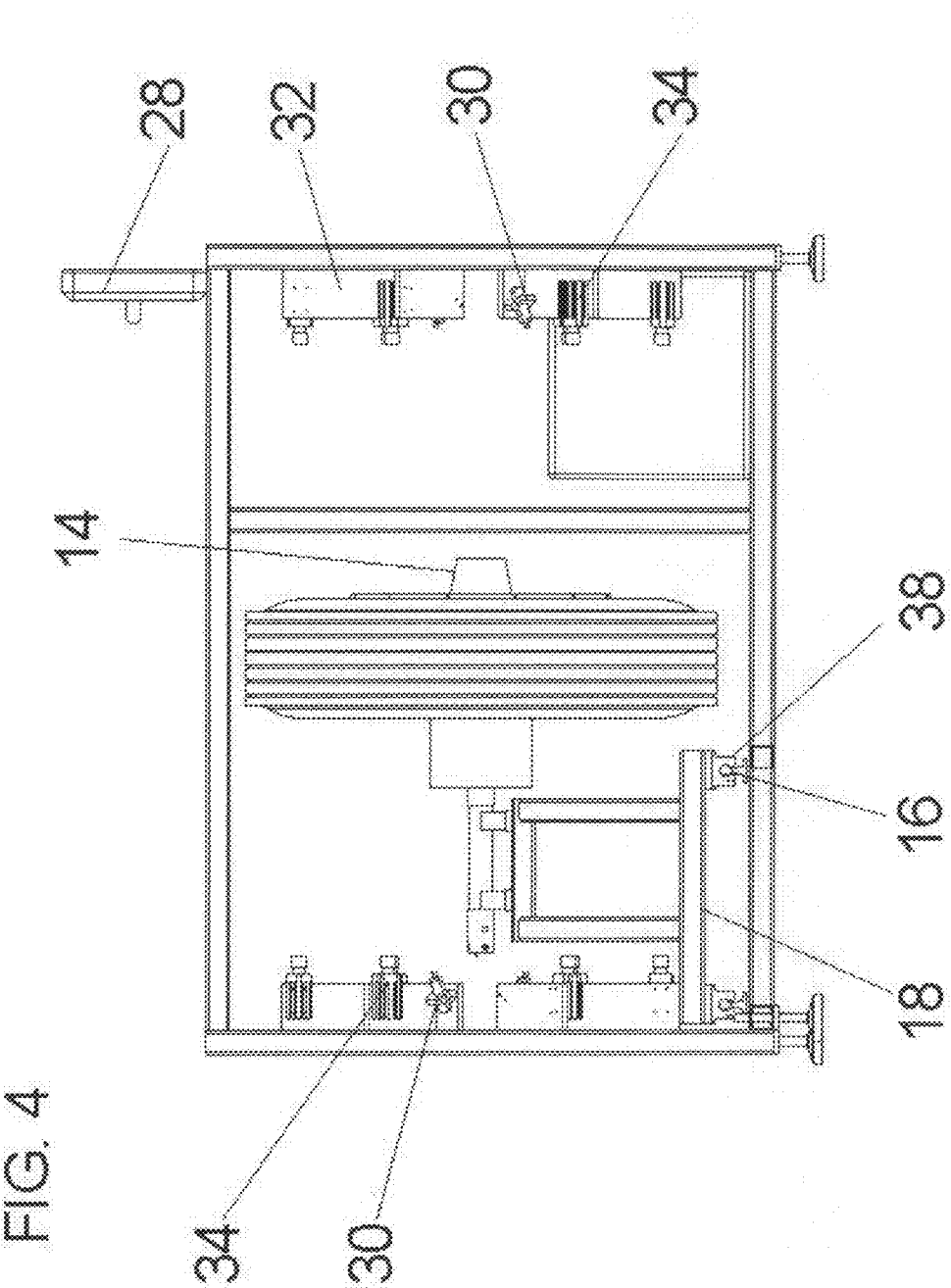
FIG. 4 is an end view of the tire inspection apparatus of FIGS. 1 and 2.
Figure 5:
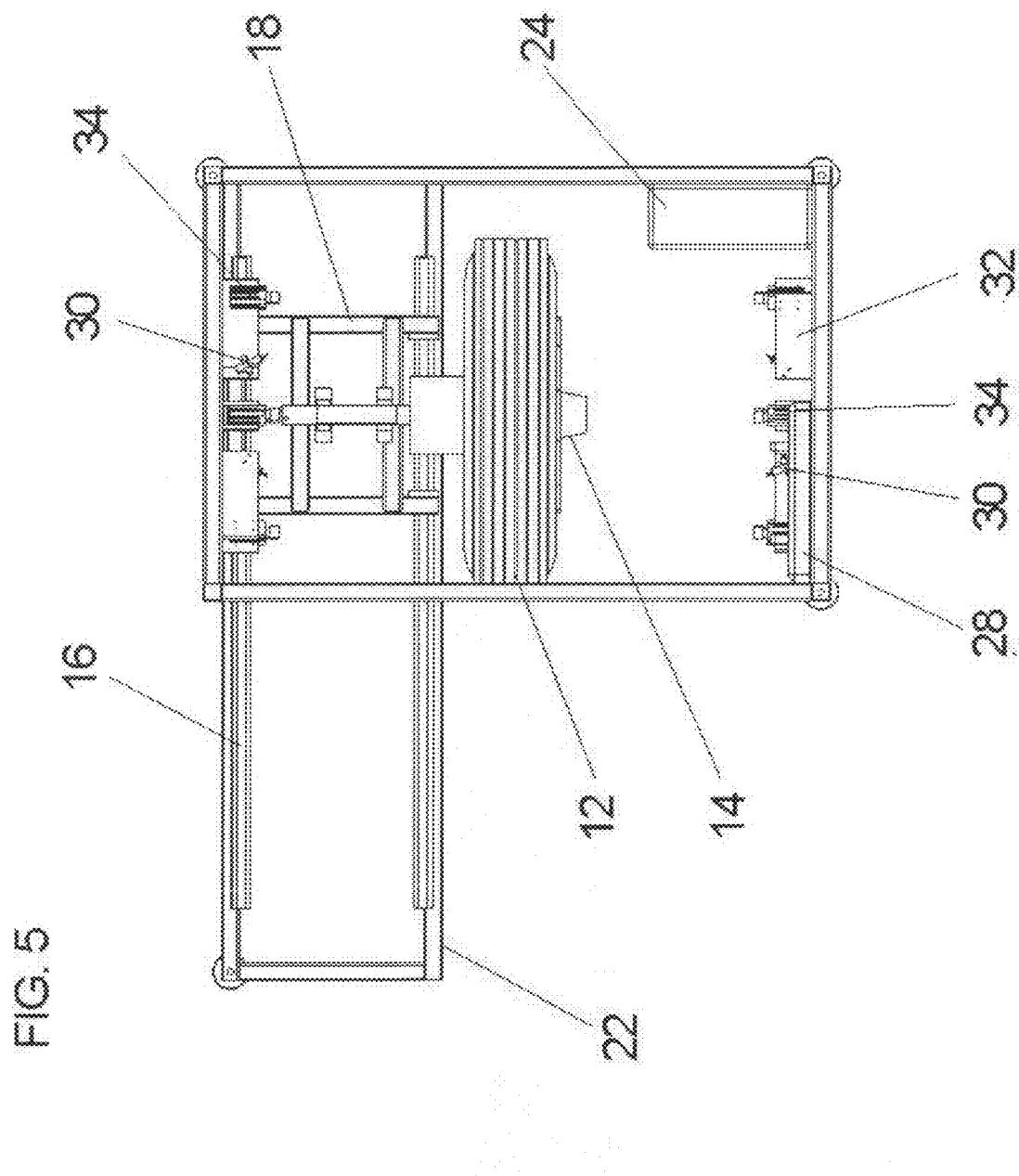
FIG. 5 is a top view of the tire inspection apparatus.
Figure 6:
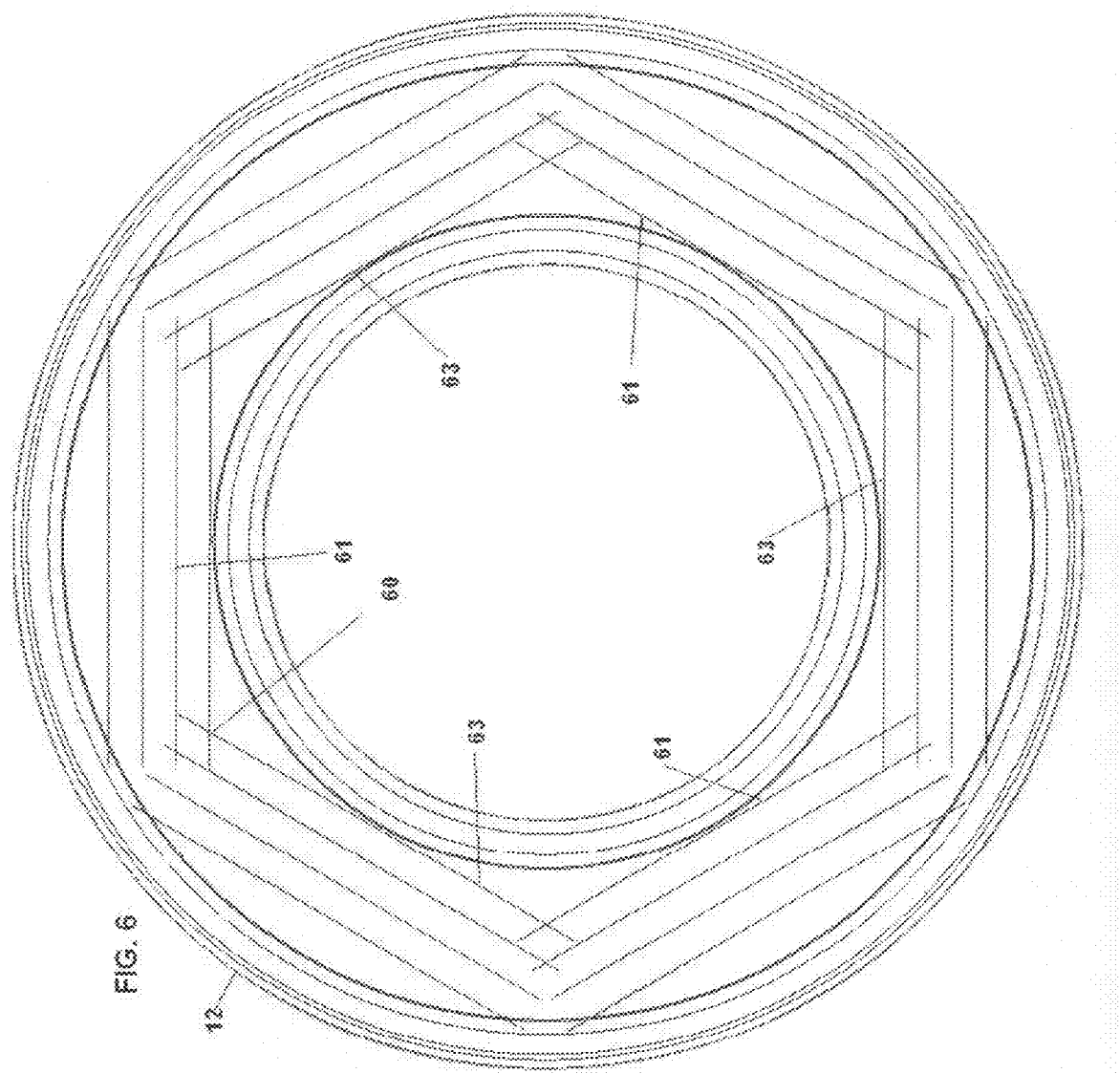
FIG. 6 illustrates the projection of scan lines on a tire.

An optical method of implementing the tire scanning techniques described here is illustrated in FIG. 6. A series of scan line segments 60 are shown projected against a tire 12. The scan line segments 60 are grouped in six sets of parallel line segments, each covering about a 60 degree arc of the tire 12. The lines in each set are substantially parallel to one another and to a tangent to the outer circumference of the tire. To avoid interference between lines 60, the sets of line segments are assigned to one of two groups 61, 63, the member line segments of which do not intersect (in other words, adjacent sets of line segments always belong to different groups. The groups 61, 63 are projected at different times, thereby avoiding interference between lines of adjacent sets. The line segments 60 are, at their center points, perpendicular to radians extending from the center of the tire. Put another way, the line segments are parallel to tangents to the tire 12. Other orientations for the lines are of course possible.

FIG. 8 illustrates tire scanner 11 with protective shields 135 installed over cage 20. Only the mandrel 14 protrudes out from the shields 135, and then only when the mandrel has been moved to the tire mounting station.

Figure 10:
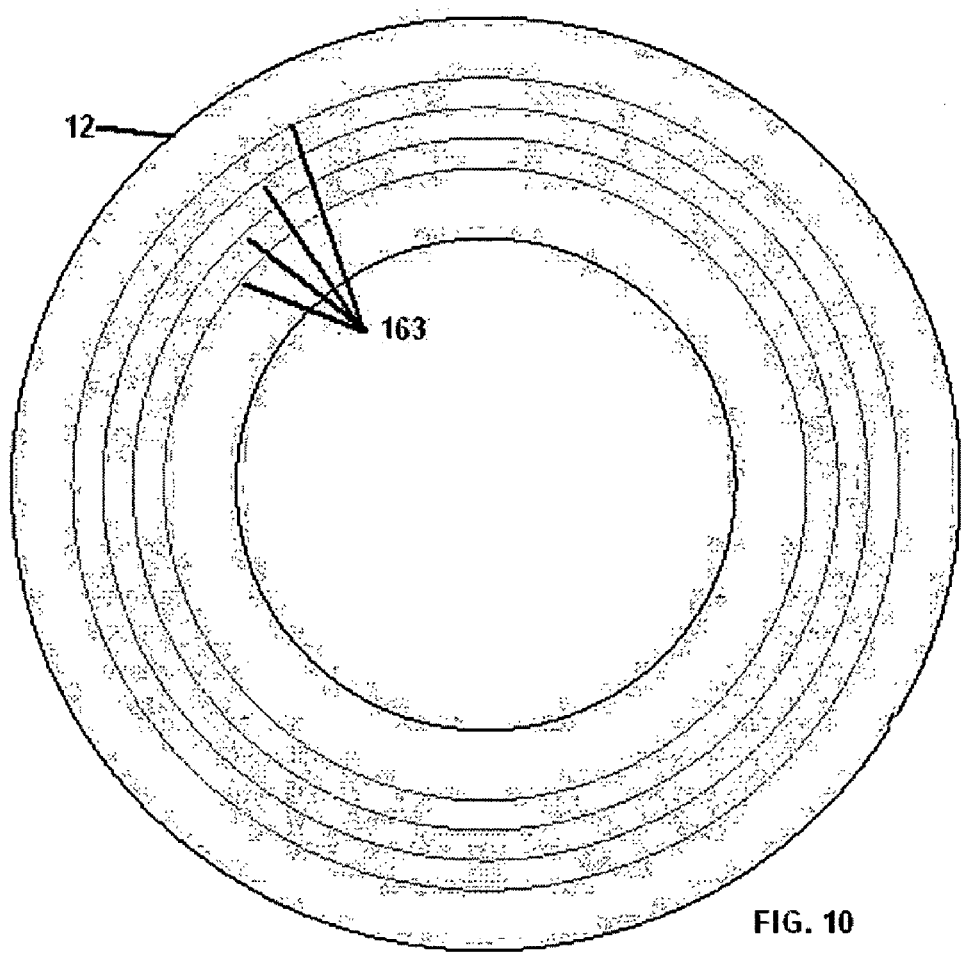
FIG. 10 is an alternative pattern for scan lines.

FIG. 10 is an alternative pattern for scan lines 163, which are circular against the sidewalls of tire 12.

By providing a rotationally fixed position of the sensors the possibility that vibration issues arising on rotation of the tire are avoided.

The appended claims are not limited by the foregoing description of an exemplary embodiment.

What is claimed is:

1. Apparatus for scanning tires, comprising:
   an optical system for identifying reference points from a surface of a tire and constructing images locating the reference points;
   a mandrel for positioning the tire relative to the optical system and for changing inflation of the tire; and
   an image processing system connected to receive the constructed images from the optical system for determining a differential height graph from changes in location of the reference points with changes in the inflation of the tire.

2. Apparatus according to claim 1, further comprising:
   the optical system including a camera for capturing images; and
   means for providing the mandrel a fixed rotational position of the tire relative to the camera system.

3. Apparatus according to claim 2, further comprising:
   an illumination system for projecting light against the surface of the tire, reflected light being utilized by the optical system in identifying the reference points.

4. Apparatus according to claim 3, the illumination system further comprising:
   a plurality of laser sources and a beam splitter for each laser source, each beam splitter illuminating sections within a region on the surface of the tire.

5. Apparatus according to claim 4, further comprising:
   the sections illuminated within a region being parallel to one another;
   the sections being line segments which at their midpoints are perpendicular to radii passing through their midpoints from the center of the tire.

6. Apparatus according to claim 4, further comprising:
   a plurality of light sources arrayed around the tire in order to illuminate sections of a tire sidewall at sufficient resolution to detect zippers.

7. Apparatus according to claim 4, further comprising:
   the illumination system providing alternating illuminated sections to avoid illumination of any region of the positioned tire by more than one laser source.

8. Apparatus according to claim 3, further comprising:
   a carriage for locating the tire to undergo scanning.

9. Apparatus according to claim 3, further comprising:
   means for sweeping the tire with light; and
   means for periodically imaging the tire to capture discrete sections of the tire as illuminated by the means for sweeping.

10. Apparatus according to claim 9, further comprising:
    the means for sweeping including means for moving a laser beam in a radial direction relative to the center of the tire.

11. A tire inspection system comprising:
    a scanning system for detecting energy reflected by a tire at a tire scanning location; and
    a tire locating and positioning system for locating a tire to be scanned relative to the scanning system and positioning the tire to be rotationally fixed at the tire scanning location relative to the scanning system.

12. A tire inspection system according to claim 11, further comprising:
    an energy projection system for directing energy against exterior surfaces of a tire at the tire scanning location for detection upon reflection by the scanning system.

13. A tire inspection system according to claim 12, further comprising:
    the energy projection system including a plurality of laser sources and a beam splitter for each laser source to produce a plurality of sets of beams, the beams being directed to intercept a positioned and located tire to illuminate sections on the sidewalls of the tire.

14. A tire inspection system according to claim 13, further comprising:
    the illuminated sections of the tire being parallel to one another and to a tangent to the outer circumference of the located and positioned tire.

15. A tire inspection system according to claim 14, further comprising:
    an image and data processing system providing for illuminating alternating sets of sections to avoid illumination of any portion of the located and positioned tire by more than one laser source and for determining a height difference map for the located and positioned tire based on images captured of the reflected energy.

16. A tire inspection system according to claim 15, further comprising:
    a housing;
    a track disposed relative to the housing; and
    a carriage for carrying a tire, the carriage being disposed on the track for movement between a tire scanning location within the housing and a tire mounting location outside of the housing.

17. A tire inspection system according to claim 16, further comprising:
    a data display system for displaying the height difference map; and
    the image and data processing system controlling the data display system.

18. A tire inspection system according to claim 14, further comprising:
    means for varying the air pressure in the located and positioned tire.

19. A tire inspection system according to claim 11, further comprising:
    means for sweeping the tire with a scan line; and
    means for periodically imaging the tire to capture discrete sections of the tire as illuminated.

20. A method of inspecting a tire for defects comprising the steps of:
    locating a tire and rotationally the position of the tire in a rotationally stationary relative to light projection and image capturing systems during inspection;
    inflating the tire to a first pressure, illuminating the tire and capturing at least a first image from an illuminated section of the tire;
    changing the inflation level of the tire to a second pressure, again illuminating the tire and capturing at least a first image from an illuminated section of the tire; and
    comparing the relative positions of the captured images to produce a differential height graph for the surface of the tire.

21. The method of claim 20, the steps of illuminating the tire comprising the further steps of:
    generating at least a first laser beam; and
    splitting the laser beam into a plurality of scan lines and projecting the scan lines against an exterior sidewall of the tire in a pattern where illuminated sections from the scan lines are parallel to a tangent to the tire's circumference.

22. The method of claim 21, further comprising the steps of:
    replicating the steps of generating and splitting at a plurality of locations on the sidewall of the tire.

23. The method of claim 21, further comprising the steps of:
    scanning the tire with a line of light; and
    capturing discrete images of the tire to produce a data set representing the tire along discrete sections of the tire.

* * * * *